(12) United States Patent  
Wu

(10) Patent No.: US 8,721,189 B2  
(45) Date of Patent: May 13, 2014

(54) OPTICAL FIBER CONNECTOR ASSEMBLY

(75) Inventor: Kai-Wen Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 142 days.

(21) Appl. No.: 13/445,924

(22) Filed: Apr. 13, 2012

(65) Prior Publication Data

US 2013/0044982 A1 Feb. 21, 2013

(30) Foreign Application Priority Data

Aug. 18, 2011 (TW) .............................. 100129494 A

(51) Int. Cl.
G02B 6/36 (2006.01)
(52) U.S. Cl.
USPC .......................................................... 385/77
(58) Field of Classification Search
None
See application file for complete search history.

(56) References Cited

U.S. PATENT DOCUMENTS

| | | | |
|---|---|---|---|
| 2010/0254661 A1* | 10/2010 | Sun et al. ........................ | 385/75 |
| 2011/0013872 A1* | 1/2011 | Zhang et al. .................... | 385/93 |
| 2011/0262082 A1* | 10/2011 | Sakurai et al. .................. | 385/89 |
| 2011/0268396 A1* | 11/2011 | He et al. .......................... | 385/93 |
| 2011/0305417 A1* | 12/2011 | Wang et al. ..................... | 385/39 |
| 2012/0002930 A1* | 1/2012 | Lin et al. ........................ | 385/101 |
| 2012/0207433 A1* | 8/2012 | He et al. .......................... | 385/33 |
| 2012/0213477 A1* | 8/2012 | He et al. .......................... | 385/58 |
| 2012/0213482 A1* | 8/2012 | Su et al. .......................... | 385/93 |
| 2013/0051736 A1* | 2/2013 | Chang ............................. | 385/92 |
| 2013/0051737 A1* | 2/2013 | Chang ............................. | 385/92 |
| 2013/0136398 A1* | 5/2013 | Isenhour et al. ................ | 385/71 |
| 2013/0148930 A1* | 6/2013 | Ko et al. ......................... | 385/88 |
| 2013/0163938 A1* | 6/2013 | Wang et al. ..................... | 385/89 |
| 2013/0322831 A1* | 12/2013 | SAKURAI et al. ............ | 385/89 |

* cited by examiner

*Primary Examiner* — Sung Pak  
(74) *Attorney, Agent, or Firm* — Novak Druce Connolly Bove + Quigg LLP

(57) ABSTRACT

An optical fiber connector assembly includes a first, and second plug connectors, and a socket connector. The first plug connector includes a first main portion and a first plate with a first front surface defining alignment holes. A first distance is defined between the first front surface and the first main portion. The second plug connector includes a second main portion and a second plate with a second front surface. A second distance is defined between the second front surface and the second main portion. The socket connector includes a side surface defining a recess with a bottom surface. A third distance is defined between the side surface and the bottom surface. Alignment pins extend from the bottom surface. The length of each alignment pin is defined as a fourth distance. The third distance is equal to the first distance and greater than sum of the second and fourth distances.

17 Claims, 5 Drawing Sheets

OPTICAL FIBER CONNECTOR ASSEMBLY

BACKGROUND

1. Technical Field

The present disclosure relates to connector assemblies and, particularly, to an optical fiber connector assembly.

2. Description of Related Art

Recently, a new type of optical fiber connector assembly has been developed based on a universal serial bus (USB) connector assembly. The optical fiber connector assembly includes an optical fiber plug connector of which the configuration is substantially the same as a USB plug connector and an optical fiber socket connector. It is desired that the optical fiber socket connector is capable of connecting to the USB plug connector or optically coupling with the optical fiber plug connector. However, the optical fiber plug connector needs to be precisely aligned with the optical fiber socket connector to ensure successful light signal transmittance. As such, the optical fiber socket connector usually includes alignment pins and the optical fiber plug connector defines alignment holes for receiving corresponding alignment pins. However, the USB plug connector does not define alignment holes. As a result, when the USB plug connector is connected to the optical fiber socket connector, the alignment pins and the USB connector can be damaged from misalignment.

Therefore, an optical fiber connector assembly, which can overcome the above-mentioned problems, is needed.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
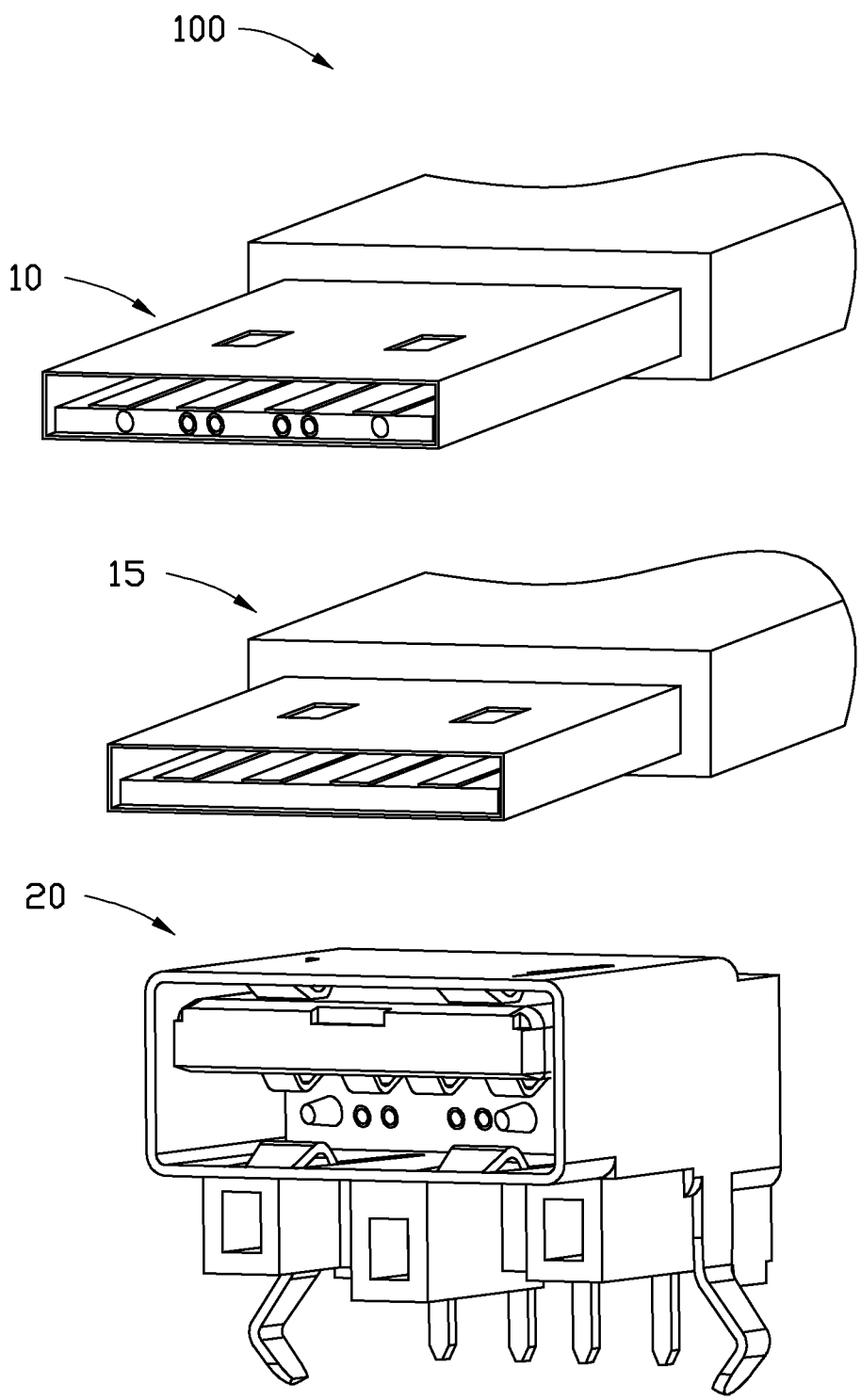
FIG. 1 is an isometric and schematic view of an optical fiber connector assembly, according to a first embodiment, the optical fiber connector assembly including a first plug connector, a second plug connector, and a socket connector.

FIG. 1 shows an optical fiber connector assembly 100, according to a first embodiment. The optical fiber connector assembly 100 includes a first plug connector 10, a second plug connector 15, and a socket connector 20. In this embodiment, the first plug connector 10 is an optical fiber plug connector. The second plug connector 15 is a USB plug connector. The first plug connector 10 has the same configuration as the second plug connector 15. The socket connector 20 is an optical fiber connector capable of optically coupling with first plug connector 10 or electrically connecting to the second plug connector 15.

Figure 2:
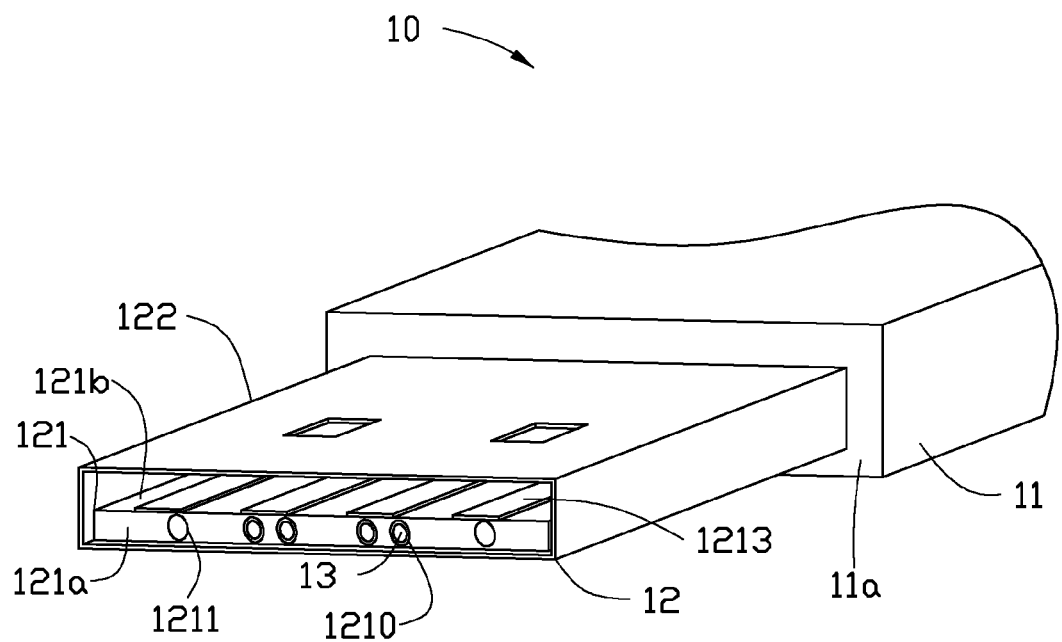
FIG. 2 is an isometric and schematic view of the first plug connector of the optical fiber connector assembly of FIG. 1.

FIG. 2 shows the first plug connector 10 including a first main portion 11 and a first connection portion 12. The first main portion 11 includes a first end surface 11a. The first connection portion 12 extends out of the first main portion 11 from the first end surface 11a. The first connection portion 12 includes a first plate 121 and a tubular first housing 122 housing the first plate 121. The first plate 121 includes a first front surface 121a facing away from the first end surface 11a and a first top surface 121b perpendicularly connecting the first front surface 121a. The first front surface 121a defines a plurality of first receiving holes 1210. Each of the first receiving holes 1210 receives a first optical fiber element 13. In this embodiment, there are four first receiving holes 1210. The first front surface 121a further defines at least one alignment hole 1211. In this embodiment, there are two alignment holes 1211 respectively positioned at two sides of the first receiving holes 1210. A first distance is defined between the first front surface 121a to the main portion 11. The first connection portion 12 further includes a plurality of first contact terminals 1213 positioned on the first top surface 121b and uniformly arranged on an intersection line of the first front surface 121a and the first top surface 121b. The contact terminals 1213 are electrically connected to corresponding signal leads (not show) arranged in the first plate 121. In this embodiment, there are four first contact terminals 1213. The first housing 122 is made of metal and generally rectangular. The periphery of the first housing 122 slightly protrudes from the second front surface 121a.

Figure 3:
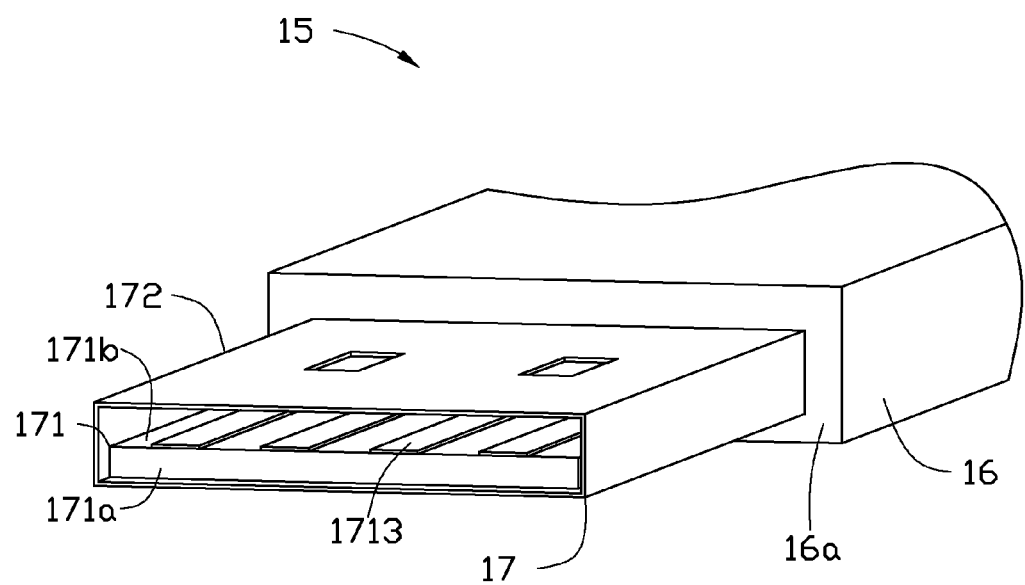
FIG. 3 an isometric and schematic view of the second plug connector of the optical fiber connector assembly of FIG. 1.

FIG. 3 shows the second plug connector 15 including a second main portion 16 and a second connection portion 17. The second main portion 16 includes a second end surface 16a. The second connection portion 17 extends out of the second main portion 16 from the second end surface 16a. The second connection portion 17 includes a second plate 171 and a tubular second housing 172 housing the second plate 171. The second plate 171 includes a second front surface 171a facing away from the second end surface 16a and a second top surface 171b perpendicularly connecting the second front surface 171a. A second distance is defined between the second front surface 171a and the second main portion 16. The second connection portion 17 further includes a plurality of second contact terminals 1713 positioned on the second top surface 171b and uniformly arranged on an intersection line of the second front surface 171a and the second top surface 171b. The contact terminals 1713 are electrically connected to corresponding signal leads (not show) arranged in the second plate 171. In this embodiment, there are four second contact terminals 1713. The second housing 172 is made of metal and generally rectangular. The periphery of the second housing 172 slightly protrudes from the second front surface 171a.

Figure 4:
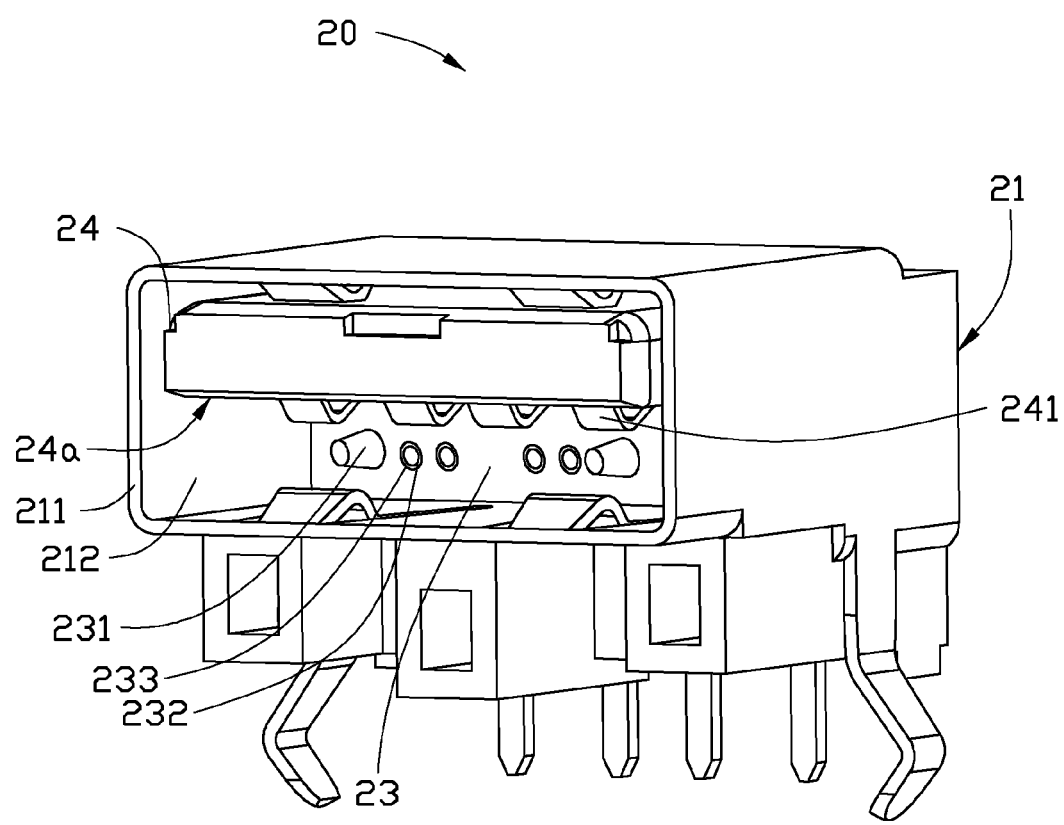
FIG. 4 is an isometric and schematic view of the socket connector of the optical fiber connector assembly of FIG. 1.

FIG. 4 shows the socket connector 20 including a first side surface 21 and a second side surface 211 opposite to the first side surface 21. The second side surface 211 defines a generally rectangular recess 212 indented towards the first side surface 21. The recess 212 corresponds to the first housing 122 and the second housing 172 in shape, and includes a bottom surface 23 substantially parallel to the second side surface 211. A third distance is defined between the bottom surface 23 and the second side surface 211. The bottom surface 23 defines a plurality of second receiving holes 233. Each of the second receiving holes 233 receives a second optical fiber element 232. In this embodiment, there are four second receiving holes 233. The socket connector 20 further includes at least one alignment pin 231 extending up from the bottom surface 23. In this embodiment, two alignment pins 231 are respectively positioned at two sides of the second receiving holes 233. Each alignment pin 231 corresponds to an alignment hole 1211 and is configured to be inserted into the corresponding alignment hole 1211. The length of each alignment pin 231 along a direction perpendicular to the bottom surface 23 is defined as a fourth distance. In this embodiment, the third distance is equal to the first distance and is greater than or equal to the sum of the second distance and the fourth distance.

The socket connector 20 further includes a third plate 24 extending up from the bottom surface 23 and a plurality of third contact terminals 241. The third plate 24 includes a matching surface 24a substantially perpendicular to the bottom surface 23. The third contact terminals 241 are uniformly disposed on the matching surface 24a. In this embodiment, there are four third contact terminals 241.

When assembling the first plug connector 10 and the socket connector 20, the first connection portion 12 is received in the recess 212. The first end surface 11a attaches on the second surface 211, the third plate 24 is received in the first housing 122 and is attached on the first plate 121 with each first contact terminal 1213 contacting with a corresponding third contact terminal 241. Because the first distance is equal to the third distance, the first front surface 121a substantially contacts the bottom surface 23 with each first optical fiber element 13 aligning with a corresponding second optical fiber element 232 and an alignment pin 231 receiving in a corresponding alignment hole 1211. In this embodiment, the alignment holes 1211 receive the alignment pins 231 to ensure each first optical fiber element 13 aligns with a corresponding second optical fiber element 232 and light signal transmittance therebetween. When assembling the second plug connector 15 and the socket connector 20. The second connection portion 17 is received in the recess 212, the second end surface 16a attaches on the second surface 211, the third plate 24 is received in the second housing 172 and attached on the second plate 171. Each second contact terminal 1713 contacts with a corresponding third contact terminal 241 such that the second plug connector 15 is electrically connected to the socket connector 20, because the third distance is greater than or equal to the sum of the second distance and the fourth distance. The distance between the second front surface 171a and the bottom surface 23 is equal to or greater than the fourth distance as such the second front surface 171a cannot collide with and damage the alignment pins 231.

Figure 5:
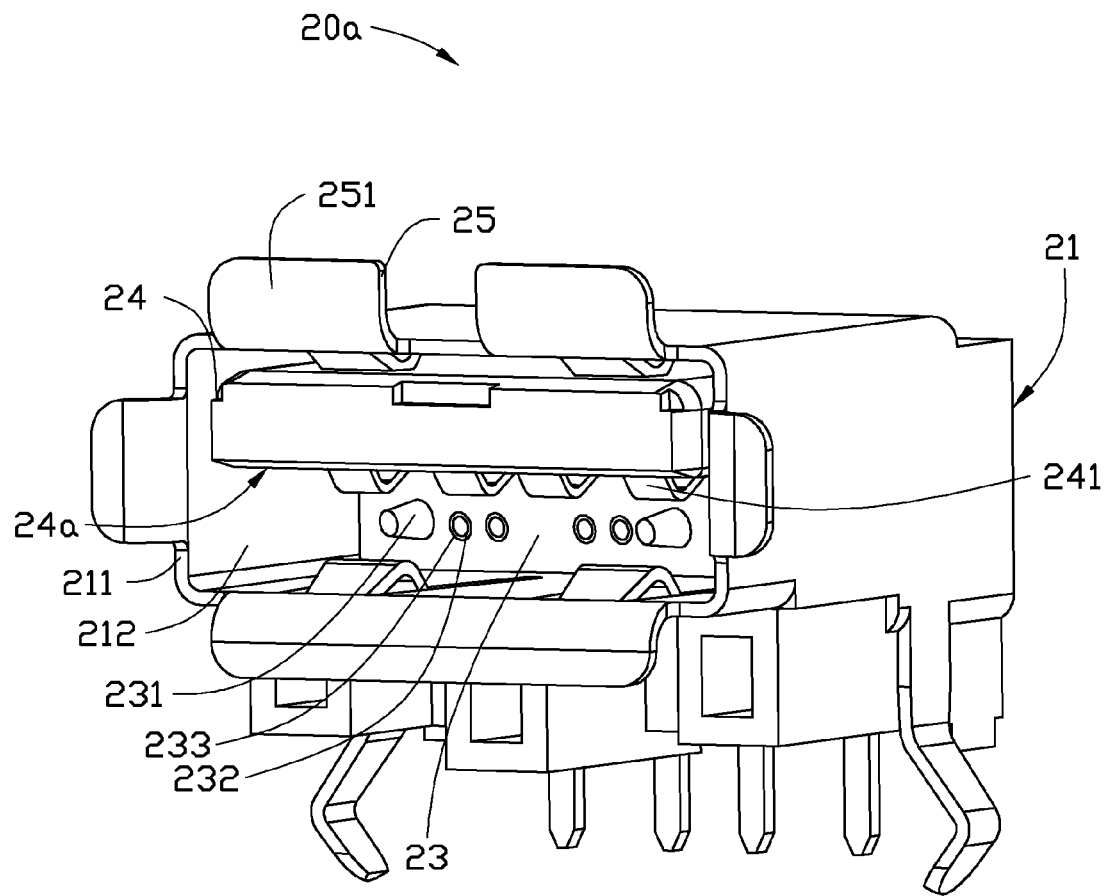
FIG. 5 is an isometric and schematic view of a socket connector of an optical fiber connector assembly, according to a second embodiment.

FIG. 5 shows a socket connector 20a, according to a second embodiment. The socket connector 20a is generally the same as the socket connector 20 of the first embodiment, except that the socket connector 20a further includes a plurality of stoppers 25 extending from the second side surface 211 along a direction substantially parallel to the second side surface 211. Each stopper 25 is generally a plate and includes an abutting surface 251 parallel to the bottom surface 23. A distance between the abutting surface 251 and the bottom surface 23 is defined as the fifth distance. In this embodiment, the fifth distance is equal to the first distance and is greater than or equal to the sum of the second distance and the fourth distance.

When assembling the first plug connector 10 and the socket connector 20a, the first end surface 11a attaches on the abutting surface 251, because the fifth distance is equal to the third distance, the first front surface 121a substantially contacts the bottom surface 23. When assembling the second plug connector 15 and the socket connector 20a, the second end surface 16a attaches on the abutting surface 251, because the fifth distance is greater than or equal to the sum of the second distance and the fourth distance, the distance between the second front surface 171a and the bottom surface is equal to or greater than the fourth distance as such the second front surface 171a cannot collide with the alignment pins 231.

The socket connectors 20, 20a are capable of being precisely optically coupled with first plug connector 10 and electrically connected to the second plug connectors 15 and avoid the second plug connector 15 from colliding with the alignment pins 231.

The above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. An optical fiber connector assembly, comprising:
   a first plug connector comprising:
      a first main portion having a first end surface; and
      a first connection portion extending out from the first end surface, the first connection portion comprising a first plate, a first housing receiving the first plate, and a plurality of first optical elements, the first plate comprising a first front surface defining a plurality of first receiving holes and alignment holes, each receiving hole receiving a first optical element, a first distance being defined between the first end surface and the first front surface;
   a second plug connector comprising:
      a second main portion having a second end surface; and
      a second connection portion extending out from the second end surface, the second connection portion comprising a second plate and a second housing receiving the second plate, the second plate comprising a second front surface, a second distance being defined between the second end surface and the second front surface; and
   a socket connector configured to connected with one of the first plug connector and the second plug connector, the socket connector comprising:
      a first side surface;
      a second side surface opposite to the first side surface, the second side surface defining a recess indented towards the first side surface, the recess having a bottom surface parallel to the second side surface, a third distance being defined between the second side surface and the bottom surface; and
      a plurality of alignment pins extending from the bottom surface, each alignment pin spatially corresponding to a respective one of the alignment holes, the length of each alignment pin along a direction perpendicular to the bottom surface being defined as a fourth distance; the bottom surface defining a plurality of second receiving holes, each second receiving hole receiving a second optical element, each second optical element being configured for transmitting light signal with a corresponding first optical element;
   wherein each of the first connection portion and the second connection portion is configured for being received in the recess, each of the first end surface and the second end surface is configured to attach on the second side surface, the third distance is equal to the first distance and greater than or equal to the sum of the second distance and the fourth distance.

2. The optical fiber connector assembly of claim 1, wherein the socket connector comprises two of the alignment pins and defines four of the second receiving holes, the two alignments pins are positioned at two sides of the first receiving holes.

3. The optical fiber connector assembly of claim 1, wherein the first front surface faces away the first end surface, the first plate defines four of the first receiving holes and two of the alignments holes on the first front surface, the two alignments holes are positioned at two sides the first receiving holes.

4. The optical fiber connector assembly of claim 1, wherein the first plate further comprises a first top surface perpendicular to the first front surface, the first connection portion further comprise a plurality of first contact terminals positioned on the first top surface.

5. The optical fiber connector assembly of claim 4, wherein the second front surface faces away the second end surface, the second plate further comprises a second top surface perpendicular to the second front surface, the second connection portion further comprise a plurality of second contact terminals positioned on the second top surface.

6. The optical fiber connector assembly of claim 5, wherein the socket connector further comprises a third plate and a plurality of third contact terminals, the third plate extends up from the bottom surface and is configured for receiving in one of the first housing and the second housing, the third plate comprises a matching surface perpendicular to the bottom surface, the third contact terminals are positioned on the matching surface, each third contact is configured to connected to one of a first contact terminal and a second contact terminal.

7. The optical fiber connector assembly of claim 6, wherein the third plate is configured to be received in the first housing and attached on the first plate.

8. The optical fiber connector assembly of claim 6, wherein the third plate is configured to be received in the second housing and attached on the second plate.

9. The optical fiber connector assembly of claim 1, wherein the first housing and the second housing are made of metal and hollow rectangular, the recess is rectangular and spatially corresponds to the first housing and the second housing.

10. The optical fiber connector assembly of claim 1, wherein the second plug connector is a universal serial bus plug connector.

11. The optical fiber connector assembly of claim 10, wherein the first plug connector substantially has the same configuration as the second plug connector.

12. An optical fiber connector assembly, comprising:
a first plug connector comprising:
a first main portion having a first end surface; and
a first connection portion extending out from the first end surface, the first connection portion comprising a first plate, a first housing receiving the first plate, and a plurality of first optical elements, the first plate comprising a first front surface defining a plurality of first receiving holes and alignment holes, each receiving hole receiving a respective first optical element, a first distance being defined between the first end surface and the first front surface;
a second plug connector comprising:
a second main portion having a second end surface; and
a second connection portion extending out from the second end surface, the second connection portion comprising a second plate and a second housing receiving the plate, the second plate comprising a second front surface, a second distance being defined between the second end surface and the second front surface; and
a socket connector comprising:
a first side surface;
a second side surface opposite to the first side surface, the second side surface defining a recess concaved towards the first side surface, the recess having a bottom surface parallel to the second side surface;
a plurality of alignment pins extending from the bottom surface, each alignment pin spatially corresponding to a respective one of the alignment holes, the length of each alignment pin along a direction perpendicular to the bottom surface being defined as a fourth distance; the bottom surface defining a plurality of second receiving holes, each second receiving hole receiving a second optical element, each second optical element being configured for transmitting light signal with a corresponding first optical element; and
a plurality of stopper extending from the second side surface, each stopper comprising an abutting surface parallel to the bottom surface, a fifth distance being defined between the abutting surface and the bottom surface;
wherein each of the first connection portion and the second connection portion is configured for being received in the recess, each of the first end surface and the second end surface is configured to attach on the abutting surface, the fifth distance is equal to the first distance and greater than or equal to the sum of the second distance and the fourth distance.

13. The optical fiber connector assembly of claim 12, wherein the socket connector comprises two of the alignment pins and defines four of the second receiving holes, the two alignments pins are positioned at two sides the first receiving holes.

14. The optical fiber connector assembly of claim 12, wherein the first front surface faces away the first end surface, the first plate defines four of the first receiving holes and two of the alignments holes on the first front surface, the two alignments holes are positioned at two sides of the first receiving holes.

15. The optical fiber connector assembly of claim 12, wherein the second plug connector is a universal serial bus plug connector.

16. The optical fiber connector assembly of claim 15, wherein the first plug connector substantially has the same configuration as the second plug connector.

17. The optical fiber connector assembly of claim 12, wherein each stopper is a plate and extends along a direction parallel to the second side surface.

* * * * *